US008165718B2

(12) United States Patent
Ota et al.

(10) Patent No.: US 8,165,718 B2
(45) Date of Patent: Apr. 24, 2012

(54) ROBOTIC TRANSPORTATION DEVICES AND SYSTEMS

(75) Inventors: Yasuhiro Ota, Union, KY (US); Masaru Ryumae, Union, KY (US); Keiichi Sato, Chicago, IL (US); Shin Sano, Oak Park, IL (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 104 days.

(21) Appl. No.: 12/847,572

(22) Filed: Jul. 30, 2010

(65) Prior Publication Data

US 2012/0029697 A1 Feb. 2, 2012

(51) Int. Cl.
*G05B 24/00* (2006.01)
(52) U.S. Cl. .......................... 700/259; 700/250; 382/153
(58) Field of Classification Search .................. 700/113, 700/250, 253, 258, 259; 901/1; 701/23–28; 382/153
See application file for complete search history.

(56) References Cited

U.S. PATENT DOCUMENTS

| | | | |
|---|---|---|---|
| 4,796,313 A | 1/1989 | DiMatteo et al. | |
| 5,406,658 A | 4/1995 | Olkkonen et al. | |
| 5,428,851 A | 7/1995 | Shore et al. | |
| 5,511,926 A * | 4/1996 | Iles | 414/428 |
| 6,748,292 B2 * | 6/2004 | Mountz | 700/214 |
| 6,917,854 B2 | 7/2005 | Bayer | |
| 6,945,354 B2 * | 9/2005 | Goff | 414/429 |
| 7,076,346 B2 * | 7/2006 | Sturges et al. | 701/23 |
| 7,552,490 B2 | 6/2009 | Saracen et al. | |
| 7,644,458 B2 | 1/2010 | Foster et al. | |
| 2004/0199072 A1 | 10/2004 | Sprouse et al. | |
| 2005/0228255 A1 | 10/2005 | Saracen et al. | |
| 2007/0129849 A1 * | 6/2007 | Zini et al. | 700/258 |
| 2008/0066207 A1 | 3/2008 | Beniyama et al. | |
| 2008/0161672 A1 | 7/2008 | Marar | |
| 2008/0296870 A1 * | 12/2008 | Archer et al. | 280/504 |
| 2009/0030569 A1 * | 1/2009 | Thorne | 701/25 |
| 2010/0064431 A1 | 3/2010 | Kawakami et al. | |
| 2010/0312390 A1 * | 12/2010 | Dupourque | 700/253 |
| 2011/0015816 A1 * | 1/2011 | Dow et al. | 701/23 |
| 2011/0202224 A1 * | 8/2011 | Thompson et al. | 701/26 |

* cited by examiner

*Primary Examiner* — Khoi Tran
*Assistant Examiner* — Jason Holloway
(74) *Attorney, Agent, or Firm* — Dinsmore & Shohl LLP (57) ABSTRACT

A robotic transportation device may include a device body, two docking arms, and a controller module. The device body may include at least one motorized wheel, and the two docking arms may include an adjustable wheel locking device. The two docking arms may extend horizontally from the device body and may be adjustable along first and second directions. The adjustable wheel locking devices comprise two adjustable wheel stops extending laterally from the docking arm. The controller module may cause the robotic transportation device to autonomously approach a target device, detect a device type, and adjust a position of the two docking arms and the two wheel stops in accordance with the device type. The controller module may move each adjustable wheel locking device under a target wheel of the target device to lock and lift the target wheels, and cause the robotic transportation device to autonomously transport the target device.

20 Claims, 6 Drawing Sheets

ROBOTIC TRANSPORTATION DEVICES AND SYSTEMS

TECHNICAL FIELD

The present specification generally relates to transportation devices for transporting wheeled devices and, more specifically, robotic transportation devices for autonomously picking up and delivering wheeled devices.

BACKGROUND

In hospitals and other care-giving facilities, large wheeled devices such as wheel chairs, hospital beds, patient lifting devices, etc. are often moved from one location in the facility to another location by hospital employees. The employees, such as nurses for example, manually push the wheeled device to the desired location. This may require significant physical exertion, and also may take up significant employee time. The employees would be free to perform other tasks if they were not required to push around the wheeled objects. Further, employees may be very busy throughout the work shifts and may not be able to expediently pick up and deliver the wheeled devices in accordance with a schedule, leading to device unavailability and missed appointment schedules.

Accordingly, a need exists for alternative transportation devices for autonomously picking up and delivering wheeled devices in accordance with destination instructions.

SUMMARY

In one embodiment, a robotic transportation device includes a device body, two docking arms, and a controller module. The device body may include at least one motorized wheel coupled to a drive motor, and the two docking arms may include a support wheel and an adjustable wheel locking device. The two docking arms may extend horizontally from the device body and may be adjustable along at least two directions. The adjustable wheel locking devices may include two wheel stops that extend laterally from the docking arm and are adjustable along a direction parallel with the two docking arms. The controller module may include a processor and a computer readable memory having executable instructions. The executable instructions, when read and executed by the processor, may cause the controller module to provide a drive signal to the at least one motorized wheel to cause the robotic transportation device to autonomously approach a target device, detect a device type of the target device, and adjust a position of the two docking arms and the two wheel stops of each adjustable wheel locking device in accordance with the detected device type. The executable instructions may also cause the controller module to move each adjustable wheel locking device under a target wheel of the target device to lock and lift the target wheels and provide a drive signal to the at least one motorized wheel to cause the robotic transportation device to autonomously transport the target device to a desired location.

In another embodiment, a robotic transportation device includes a device body having at least one motorized wheel coupled to a drive motor, two docking arms, a wireless communications device, a device detection module, and a controller module. Each docking arm may include a support wheel and an adjustable wheel locking device, wherein the two docking arms horizontally extend from the device body and are adjustable along at least two directions. The wireless communications device may detect a location of the robotic transportation device, provide proximity data corresponding to the location of the robotic transportation device, and wirelessly receive navigational data based at least in part on facility floorplans. The device detection module may obtain device data corresponding to a target device. The controller module may include a processor and a computer readable memory having executable instructions. The controller module is electrically coupled to the wireless communications device and the device detection module. The executable instructions, when read and executed by the processor, may cause the controller module to receive the proximity data and the navigational data from the wireless communications device, receive first and second destination input signal, and provide a drive signal to the at least one motorized wheel to cause the robotic transportation device to autonomously travel to a first destination associated with the first destination input signal such that the target device autonomously approaches a target device. The drive signal may be based at least in part on a navigation route calculated from the proximity data and the navigational data. The executable instructions may further cause the controller module to receive the device data from the device detection module to determine a device type of the target device, control docking arms to engage the adjustable wheel locking devices with wheels of the target device, and provide a drive signal to the at least one motorized wheel to cause the robotic transportation device to autonomously travel to a second destination associated with the second destination input signal. The drive signal may be based at least in part on a navigation route calculated from the proximity data and the navigational data.

In yet another embodiment, a wheeled device transportation system includes a wireless communications network, a central server communicatively coupled to the wireless network, a radio frequency identification tag, and a robotic transportation device. The central server may provide navigation data over the wireless communications network. The target device has two wheels and a radio frequency identification tag configured to emit an identification signal. The robotic transportation device may include a device body having at least one motorized wheel coupled to a drive motor, two docking arms, a wireless communications device, and a controller module. Each docking arm may include a support wheel and an adjustable wheel locking device, and may extend horizontally from the device body and may be adjustable along at least two directions. The wireless communications device is communicatively coupled to the wireless communications network. The wireless communications device further detects a location of the robotic transportation device, provides proximity data corresponding to the location of the robotic transportation device, and wirelessly receives navigational data over the wireless communications network emitted by the central server. The controller module may include a processor and a computer readable memory having executable instructions. The controller module is electrically coupled to the wireless communications device and the device detection module. The controller module may receive the proximity data and the navigational data from the wireless communications device, detect a device type of the target device, and provide a drive signal to the at least one motorized wheel to cause the robotic transportation device to autonomously approach a target device. The drive signal may be based at least in part on the proximity data and the navigational data. The controller module may further control the docking arms in accordance with the device type to engage the adjustable wheel locking devices with the wheels of the target device, and provide a drive signal to the at least one motorized wheel to cause the robotic transportation device to autonomously tow the target device to a desired location.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
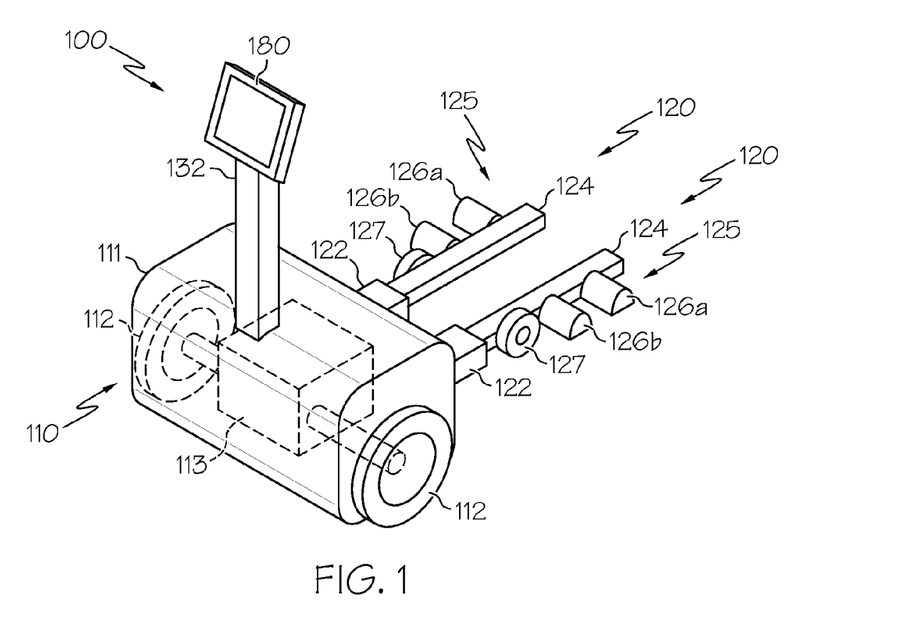
FIG. 1 depicts a perspective view of a robotic transportation device according to one or more embodiments shown and described herein.

FIG. 1 generally depicts one embodiment of a robotic transportation device for autonomously approaching a target device, docking with the target device, and delivering the target device to a desired location. The robotic transportation device generally comprises a device body having at least one motorized wheels, two docking arms having adjustable wheel locking devices, and a controller module. The controller module provides drive signals to the motorized wheels and the docking arms such that the robotic transportation device may autonomously approach a target device, such as a wheel chair or a hospital bed, for example. The controller module provides control signals to the docking arms such that target wheels of the target device are positioned upon adjustable wheel locking devices that prevent rotation of the target wheels. The controller module then provides drive signals to the motorized wheels such that the robotic transportation device autonomously transports the target device to a desired location. Various embodiments of robotic transportation devices and system and the operation thereof will be described in more detail herein.

Referring initially to FIGS. 1-4, one embodiment of a robotic transportation device 100 is illustrated. As described in more detail herein, the robotic transportation device may be deployed in a facility such as a hospital, nursing home, rehabilitation clinic, and the like, to aid caregivers in picking up and delivering various large objects such as wheel chairs, hospital beds, wheeled diagnostic centers, patient lifts, etc. The illustrated robotic transportation device 100 generally comprises a device body 110 and a pair of docking arms 120. The device body 110 comprises a body housing 111, which may be made of a metal or plastic material, and a pair of motorized wheels 112 that are coupled to a drive motor 113 that is positioned within the body housing 111. In another embodiment, more than two motorized wheels may be utilized. Alternatively, a single motorized wheel may be utilized. For example, a single motorized wheel may be used in conjunction with non-motorized wheels (not shown) to move the robotic transportation device 100. The drive motor may be an electric motor that is powered by one or more rechargeable batteries (not shown). The motorized wheels 112 and drive motor 113 may be responsive to drive signals provided by a controller module 140 (FIG. 2), as described in more detail below.

The device body 110 may also comprise an optional vertical member 132 that extends from the body housing 111. The vertical member 132 may be used to support a wireless communications device 160 and/or a human machine interface (HMI) 180. In other embodiments, the wireless communications device 160 and HMI 180 may be positioned on the device body 110 such as on the body housing 111. The HMI may be a touch screen, a computer monitor with hard and soft keys, or any other user interface device. The vertical member 132, for example, may be utilized to position the HMI 180 at a height that is easy for an operator of the robotic transportation device 100 to input data and view displayed information.

The two docking arms 120 extend horizontally from a lower portion of device body 110. Each docking arm 120 comprises a first portion 122 and a second portion 124. Coupled to the second portion 124 may be a support wheel 127 that may support the docking arm 120 on the floor or ground. The support wheel 127 may be positioned on the second portion 124 between the device body 110 and the adjustable wheel locking device 125 or between the adjustable wheel locking device 125 and the outermost end of the second portion 124. The docking arm 120 further comprises an adjustable wheel locking device 125 comprising first and second wheel stops 126a and 126b that are positioned near a distal end of the second portion 124. As described in more detail herein, a position of the first and second wheel stops 126a, 126b may be adjusted to accommodate various target wheel diameters such that the target wheels may be locked in place while the robotic transportation device 100 transports the target device to the desired location.

Figure 3:
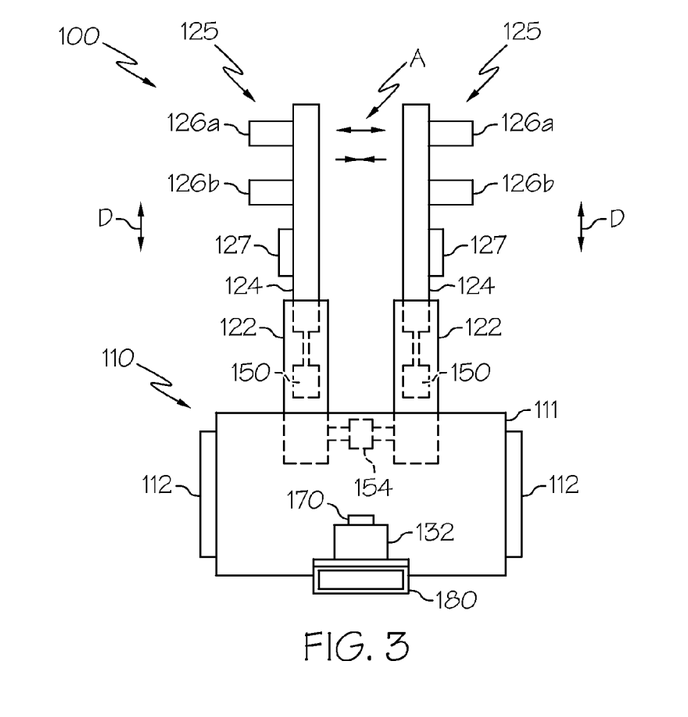
FIG. 3 depicts a top view of a robotic transportation device according to one or more embodiments shown and described herein.

As illustrated in FIG. 3, the docking arms 120 may be slidably adjusted closer and further away from one another in a first direction A. As described in more detail below, a position of the docking arms 120 may be varied along first direction A to be aligned with the target wheels of a target device when the robotic transportation device 100 approaches the target device. One end of the first portion 122 of each docking arm 120 is positioned within the body housing 111 of the device body 110. Further, a docking arm actuator 154 may be disposed within the body housing 111 of the device body 110. The docking arm actuator 154 may be mechanically coupled to the first portion 122 of each docking arm 120. The docking arm actuator 154 may be a linear motor having two members extending toward and coupled to the docking arms 120 in a direction parallel with first direction A. Actuation of the docking arm actuator 154 causes the docking arms 120 to move closer to one another or further apart from one another along first direction A such that a distance between the two docking arms 120 may be varied. Alternatively, the docking arm actuator 154 may be a pneumatic or hydraulic piston, or other similar device.

Figure 2:
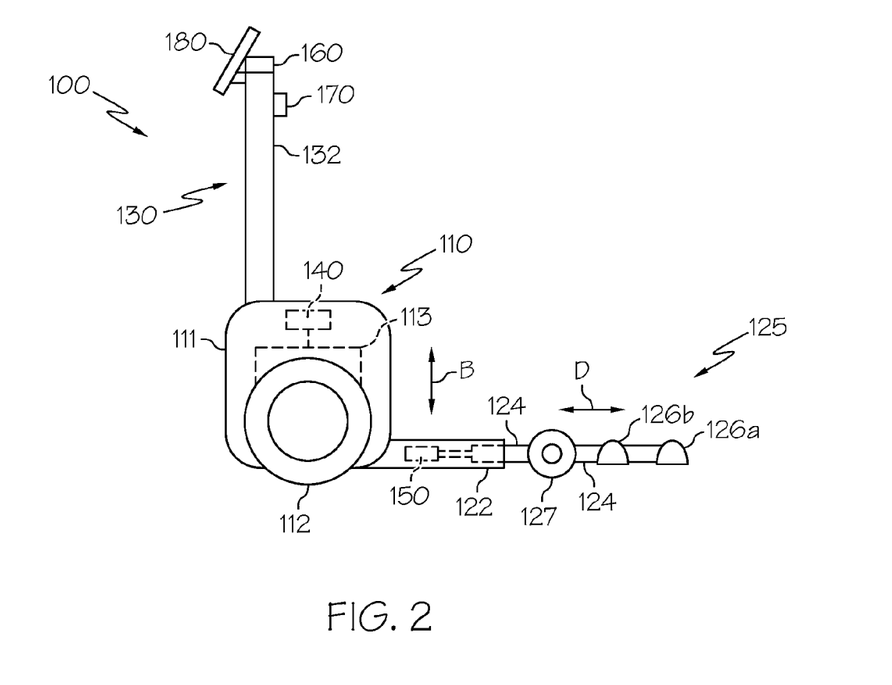
FIG. 2 depicts a side view of a robotic transportation device according to one or more embodiments shown and described herein.
Figure 4:
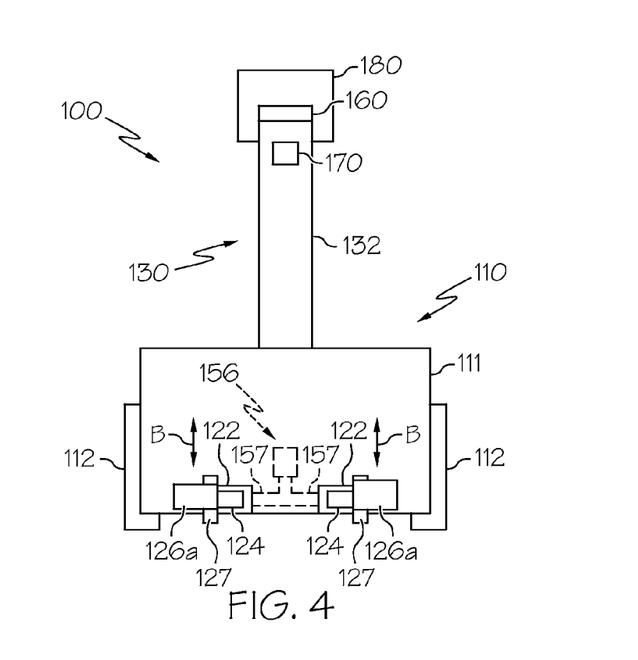
FIG. 4 depicts a front view of a robotic transportation device according to one or more embodiments shown and described herein.

Referring now to FIGS. 2 and 4, the robotic transportation device 100 may further include a vertical actuator 156 that is operable to raise and lower the docking arms 120 along vertical second direction B. As described in more detail below, the docking arms 120 may be raised after the target wheels of the target device are retained by the wheel locking devices 125 and lowered when disengaging the target device from the robotic transportation device 100. The vertical actuator 156 is coupled to each docking arm 120 via arms 157 (FIG. 4) and, upon activation, the vertical actuator 156 raises and lowers the docking arms 120. The vertical actuator 156 may be a linear motor, or a hydraulic or a pneumatic actuator. In one embodiment, the vertical actuator 156 may be the same component as the docking arm actuator 154. In such an embodiment, the actuator translates the docking arms 120 up and down along a vertical second direction B and side to side along a horizontal first direction A.

In one embodiment, a length of the docking arms 120 may be adjusted so that the docking arms 120 may be moved from a retracted position to an extended position to couple with the target wheels of a target device. As illustrated in FIG. 2, the second portion 124 of the docking arm 120 may be slidably positioned within the first portion 122. A length adjustment actuator 150 may be disposed within the first portion 122 and coupled to the second portion 124. The length adjustment actuator may be controlled to slide the second portion 124 into and out of the first portion 122 of the docking arm 120 along direction D to effectively vary the length of the docking arm. The second portion 124 may move from a retracted position to an extended position to engage the target wheels of the target device. The length adjustment actuator may be a linear motor, a hydraulic piston, a pneumatic piston, or the like. In an alternative embodiment, the docking arm 120 may not comprise a length adjustment actuator and the length of the docking arms 120 is fixed.

Figure 5:
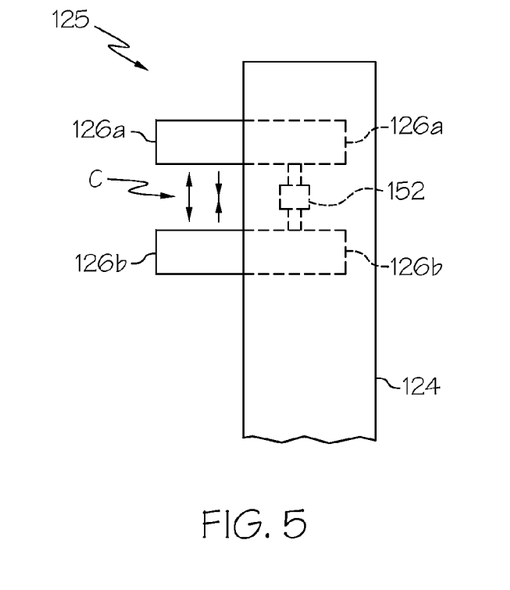
FIG. 5 depicts a top view of an adjustable wheel locking device associated with a docking arm according to one or more embodiments shown and described herein.

Now referring to FIG. 5, a wheel locking device 125 is illustrated. The wheel locking device 125 comprises two adjustable wheel stops 126a and 126b that extend laterally from a distal end of the second portion 124 of the docking arm 120 that is furthest from the device body 110. The wheel stops 126a and 126b may comprise a material having a relatively high friction coefficient (e.g., a rubber material) such that a target wheel may be maintained between wheel stops 126a, 126b. One end of each wheel stop 126a, 126b may be disposed within the docking arm 120 and coupled to a wheel stop actuator 152. The wheel stop actuator 152 may be a linear motor having two arms that are coupled to the wheel stops 126a, 126b and is operable to move the wheel stops 126a, 126b along direction C. When actuated by a wheel stop control signal provided by the controller module 140, the wheel stop actuator 152 may vary a distance between the wheel stops 126a, 126b such that the wheel locking devices 125 accommodate target wheels of various diameters. The wheel stop actuator 152 may also be configured as a pneumatic or hydraulic actuator, for example. In another embodiment, the wheel stops 126a, 126b may extend laterally from both sides of the second portion 124 of the docking arm 120. Therefore, the target wheels of the target device may be locked in place by the wheel locking devices 125 on either side of the docking arm 120. In yet another embodiment, the wheel stops 126a, 126b may extend laterally from the second portion 124 in an inward direction toward the opposing docking arm 120.

Figure 6:
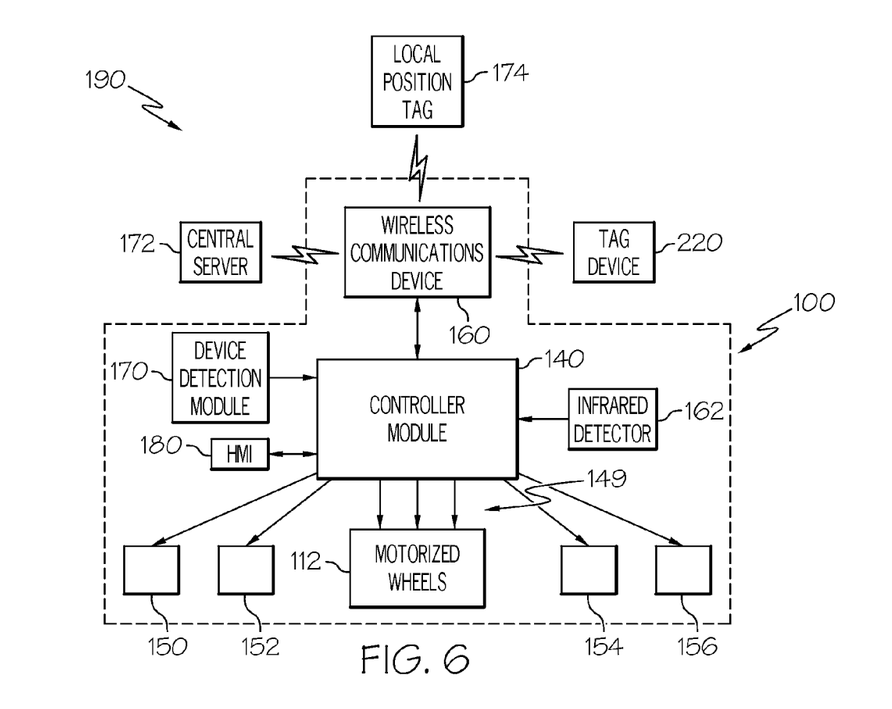
FIG. 6 depicts a schematic illustration of a robotic transportation system according to one or more embodiments shown and described herein.
Figure 7:
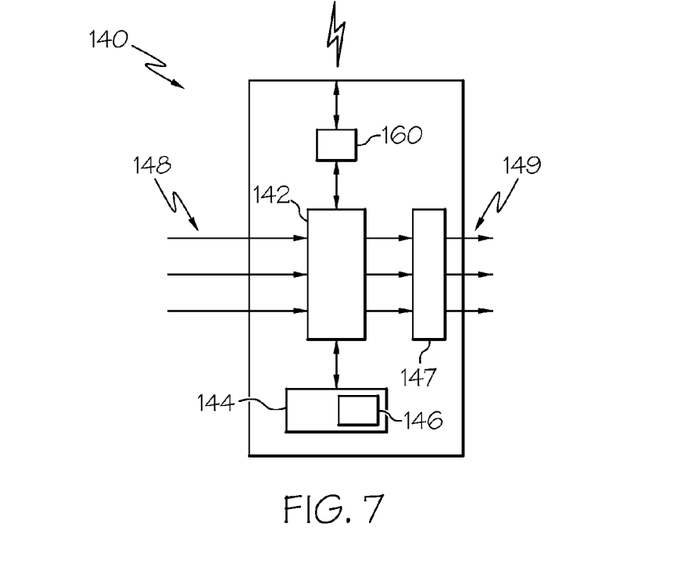
FIG. 7 depicts a schematic illustration of a controller module of a robotic transportation device according to one or more embodiments shown and described herein.

The motorized wheels 112 and various actuators described above may be controlled by the application of one or more drive signals 149 produced and provided by a controller module 140. FIG. 6 illustrates a schematic of an exemplary robotic transportation system, while FIG. 7 illustrates a schematic of an exemplary controller module 140. Referring to both FIGS. 6 and 7, the controller module 140 may comprise a processor 142, readable memory 144, and drive signal electronics 147. The readable memory 144 is operable to store computer executable instructions 146 that, when read and executed by the processor 142, cause the controller module 140 to produce the drive signals 149 that are provided to the motorized wheels 112 and to the various actuators 150, 152, 154, and 156. The executable instructions 146, when executed by the processor, may also cause the controller module 140 to perform other various tasks described herein (e.g., determine a navigation route, detect a device type, etc.). The controller module 140 may include other components (not shown), such as input signal conditioning circuits to prepare the input signals 148 prior to being received at the processor 142, an analog to digital converter for converting analog input signals 148 into digital signals, etc. In some embodiments, the processor 142 may comprise integrated analog-to-digital and digital-to-analog converters.

The controller module 140 may be electrically and/or communicatively coupled to a HMI 180, a device detection module 170, a wireless communications device 160, and an infrared detector 162. The controller module 140 may be coupled to more or fewer components in other embodiments. As illustrated in FIG. 7, the controller module 140 may receive various input signals and/or data from the coupled devices. The input signals 148 (and/or data) may include input signals provided by the various components. For example, the controller module 140 illustrated in FIG. 6 may receive image data from the device detection module 170, an identification signal and/or navigation data from the wireless communications device 160, an infrared light guide signal from the infrared detector, and an input signal from a HMI 180. The various input signals are referred to generally as input signals 148 in FIG. 7. The functionality of the various components that are coupled to the controller module 140 will be described in more detail below. The processor 142 receives these input signals 148 to determine and produce drive signals to be applied to the motorized wheels 112 to rotate as well as to the various actuators 150, 152, 154, and 156.

The drive signal electronics 147 may be provided to receive signals from the processor 142 and produce drive signals 149 that are sent to the motorized wheels 112 to control the motion of the robotic transportation device 100. The drive signal electronics 147 may include transistors or other switching devices that are configured to output voltage or current in accordance with instructions from the processor 142. The drive signal or signals 149 provided to motorized wheels 112 may depend on the particular type and configuration of the drive motor and the motorized wheels. In another embodiment, the drive signal electronics 147 may further comprise digital-to-analog converters operable to translate digital signals provided by the processor 142 into analog signals to produce analog drive signals 149 that are provided to the motorized wheels 112 and actuators.

Referring generally to FIGS. 1-12, the robotic transportation device 100 further comprises a wireless communications device 160 that receives wireless signals from various sources. In some embodiments, the wireless communications device 160 may be incorporated into the controller module 140. In other embodiments, it may be a separate component. The wireless communications device 160 may aid the robotic transportation device 100 in navigating within an area (e.g., an area of a facility such as a hospital, nursing home, rehabilitation facility, etc.). The wireless communications device 160 may be communicatively coupled to a wireless communications network. Generally, the wireless communications device 160 may receive wireless signals that are indicative of a location of the robotic transportation device 100 within the area, a location of one or more target devices, and locations of obstacles. The wireless signals may also correspond with navigation data received from a central server 172 that is also communicatively coupled to the wireless communications network. The wireless communications device 160 may also transmit wireless signals to the central server 172 and other device to navigate within the area.

The robotic transportation device 100 may determine its location within the area. In one embodiment, a plurality of local position tags 174 (FIG. 6) may be located throughout a facility (e.g., a floor or ward of a hospital). The local position tags 174 may be located on walls, obstacles (e.g., desks, nurses stations, chairs, etc.) or other locations. The local position tags 174 may emit a wireless location signal that is uniquely addressed. The wireless communications device 160 (and controller module 140) may receive the wireless signals as proximity data from the local position tags 174. The proximity data corresponding to the signals from the local position tags 174 may be provided to the controller module 140. The controller module 140 may use the proximity data to determine a position of the robotic transportation device 100 within the facility. The position may then be used to navigate the robotic transportation device 100 throughout the facility in accordance with a calculated navigation route. The navigation route may be calculated by the controller module 140 or the central server 172. The local position tags 174 may define portions of the area that are restricted to prevent the robotic transportation device from entering such areas. Infrared and/or ultrasonic sensors may also be used for collision avoidance. The robotic transportation device 100 may also use other methods of determining a location within the facility, such as a global position system, for example.

Operation of an exemplary robotic transportation device 100 will now be described. One or more robotic transportation devices 100 may be deployed in an area such as a hospital. The robotic transportation devices 100 may be used to pick up and deliver target devices. For example, the robotic transportation devices 100 may autonomously navigate within the hospital to pick up and drop of wheel chairs, hospital beds, mobile diagnostic stations, and the like.

An idle robotic transportation device 100 may be located at a base station, such as a battery charging station. It may then receive a first destination input signal that corresponds to a destination location of a particular target device. For example, the target device may be a hospital bed 200 (FIGS. 8 and 11) a wheel chair 300 (see FIG. 9), a patient lift device 400 (FIG. 10), a cart 400 (FIG. 12), etc. The robotic transportation device 100 may also receive a second destination input signal that corresponds to a desired delivery location of which the robotic transportation device 100 is to deliver the target device. It should be understood that more than two destination input signals may be provided. The first and second destination input signals may be received from the HMI device 180. For example, a hospital employee may have entered the first and second destinations into the HMI device 180. The first destination may be a particular patient's room and the second destination may be a test location, such as an magnetic resonance imaging test room. The hospital employee, in one embodiment, may also enter information corresponding to the type of target device. For example, the hospital employee may enter the type of wheel chair that the robotic transportation device 100 is supposed to pick up and deliver. Alternatively, the first and second destination input signal, as well as target device data, may be received from the central server 172 via the wireless communications device 160. In this embodiment, a hospital employee may enter in destination information into a software program that dispatches a robotic transportation device 100 by transmitting the destination information thereto.

Once the robotic transportation device 100 receives the first and second destination input signals, the position of the robotic transportation device 100 may be determined and a navigation route determined by the controller module 140 and/or the central server 172. As described above, the position of the robotic transportation device 100 may be determined via proximity data derived from wireless signals provided by one or more local position tags 174. The local position tags 174 may be RFID tags and the wireless communications device 160 may detect the signals provided by such tags. The proximity data may also be generated by global positioning data. The memory 144 of the controller module 140 may have navigational data stored thereon. Navigational data may be facility floorplans, as well as information regarding large obstacles that may be present. For example, the navigational data may indicate desks, nurses stations, chairs, and other objects that may be located throughout the floorplans of the facility. In another embodiment, the navigational data may be stored on the central server 172 and wirelessly communicated to the robotic transportation device 100.

A navigation route may be determined based on the destination input signals, the proximity data (i.e., the current location of the robotic transportation device 100), and the navigation data. The controller module 140 may provide drive signals to the motorized wheels 112 such that the robotic transportation device 100 autonomously moves toward the target device corresponding with the first destination input signal. Infrared and/or sonar devices may be used for obstacle avoidance.

Figure 8:
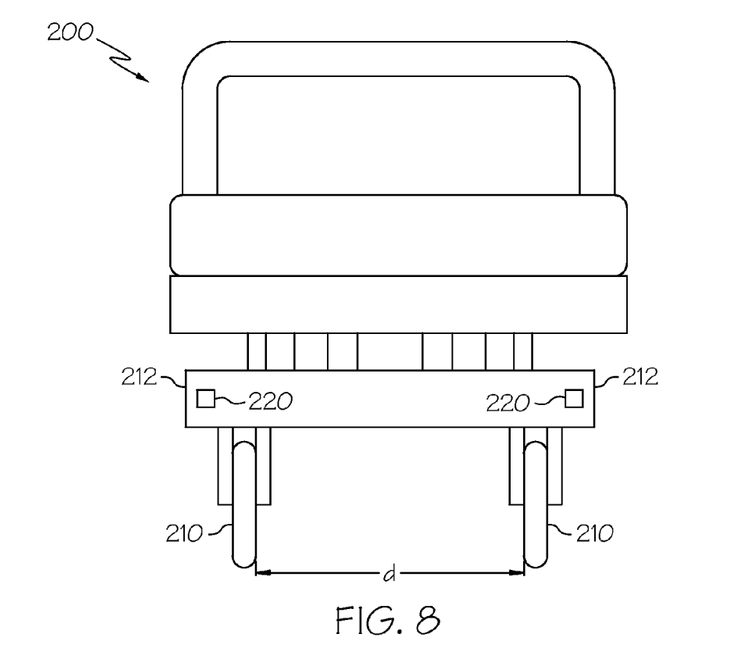
FIG. 8 depicts a front view of a hospital bed target device according to one or more embodiments shown and described herein.

Once the robotic transportation device 100 is located near the target device, it may detect the position and type of target device. Referring to FIG. 8, a hospital bed 200 is illustrated. The hospital has a frame 212 on which two device tags 220 may be positioned. Alternatively, there may be only one device tag 220 or no device tag positioned on the target device. The device tags 220 may be RFID tags that transmit a wireless identification signal indicative of the type of target device. The RFID signal may be detected by the wireless communications device 160 in one embodiment. In another embodiment, the RFID signal or other target device signal may be detected by a device detection module 170. The device detection module 170, or the wireless communications device 160 may be equipped with a radio frequency receiver capable of receiving the radio frequency signal from the device tags 220. The device tags 200 (or single device tag) may be configured as other wireless devices capable of transmitting an identification signal, such as infrared signals, or WiFi signals, for example.

The identification signal may provide or otherwise indicate device data associated with the particular target device. The device data may be provided to the controller module 140 by the device detection module 170. In an alternative embodiment, the controller module 140 may receive or determine the device data. The device data may include the make and model of the target device, the overall dimensions of the target device, position of the target device wheels, etc. From the device data, the controller module 140 may determine the type of target device (e.g., a hospital bed).

The device detection module 170 may also be a visual module such as a camera device. The camera device may take a digital image of the target device, which is provided to the controller module 140. The controller module 140 may compare the digital image with a plurality of registered device types stored within the memory 144 to determine the type of target device. For example, a digital image of the hospital bed illustrated in FIG. 8 may be compared with registered devices. Based on the comparison, the controller module 140 may determine that the target device is a hospital bed. It may also determine the relative position of the target devices wheels and other details. To accurately navigate throughout the facility while coupled with the target device, the robot controller may determine the overall dimensions of the robotic transportation device 100 when coupled to the target device.

Still referring to FIG. 8, the device data may indicate to the robotic transportation device 100 that the hospital bed 200 has two target device wheels 210 having a particular diameter that are separated by a distance d. The controller module 140 may adjust the docking arms 120 and associated wheel adjustable wheel locking devices 125 in accordance with the type of target device. Also referring to FIGS. 1-7, the controller module 140 may provide drive signals to the length adjustment actuator 150, the wheel stop actuator 152, the docking arm actuator 154, and the vertical actuator 156 to prepare the robotic transportation device 100 for docking with the target device (e.g., hospital bed 200). For example, the docking arms 120 may be lowered and positioned such that the adjustable wheel locking devices 125 are substantially aligned with the target device wheels 210. The docking arms 120 may be moved along direction A so that the adjustable wheel locking devices 125 are separated by a distance d in accordance with the distance d between the target wheels 210. Further, the wheel stop actuator 152 may be actuated such that the wheel stops 126a, 126b, are moved such that the wheel locking devices 125 may accept the target wheels 210. The controller module 140 may align the robotic transportation device 100 with the target device using the camera of the device detection module 170 described above, or using the wireless signals provided by the device tags 220. In another embodiment, the target device may also have infrared light guides (not shown) that emit an infrared signal. The infrared detector 162 (FIG. 6) of the robotic transportation device 100 may detect the infrared signal and the controller module 140 may determine the position of the robotic transportation device 100 with respect to the target device.

In one embodiment, the docking arm actuator 154 moves the second portion 124 of the docking arms 120 toward the target wheels 210 such that the wheel stops 126a, 126b slide underneath the target wheels 210. In another embodiment, the motorized wheels 112 may be actuated such that the robotic transportation device 100 drives forward toward the target device 200 and the wheel stops 126a, 126b slide underneath the target device wheels 210. Once the wheel stops 126a, 126b are underneath the target device wheels 210, the wheel stop actuator 152 may be further adjusted such that the wheel locking devices 125 lock the target wheels 210 in place. The vertical actuator 156, if present in the robotic transportation device 100, may then lift the docking arms 120 and the target wheels. The wheel locking devices 125 may also engage the target wheels by positioning the docking arms 120 and wheel locking devices 125 in between the target wheels. The docking arm actuator 154 may be controlled to move the docking arms 120 outwardly such that the wheel stops 126a, 126b engage the target wheels from an inner side of each target wheel. The wheel stop actuators 152 may then be controlled such that the wheel stops 126a, 126b move closer to one another and lock the target wheels.

Figure 9:
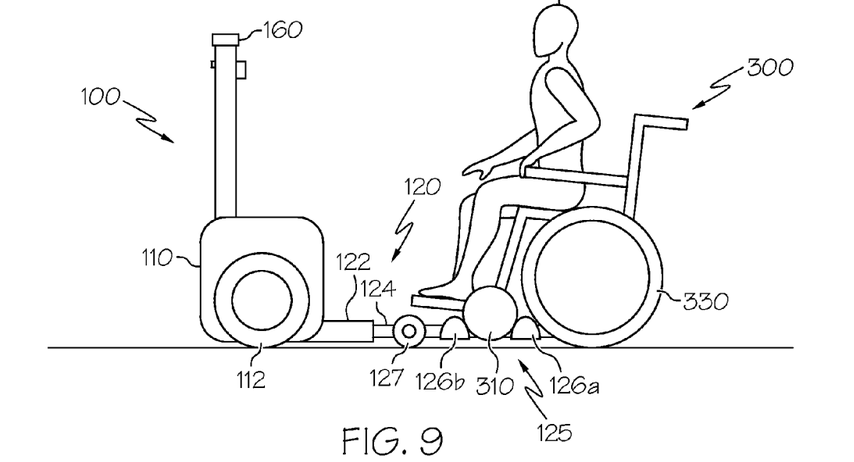
FIG. 9 depicts a robotic transportation device in an engaged position with a wheel chair according to one or more embodiments shown and described herein.
Figure 10:
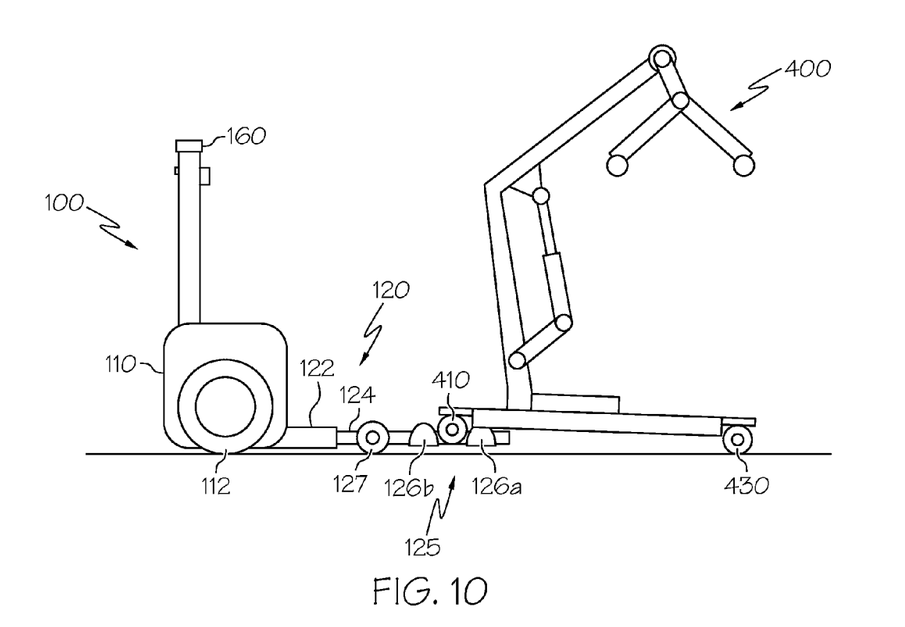
FIG. 10 depicts a robotic transportation device in an engaged position with a lift device according to one or more embodiments shown and described herein.
Figure 11:
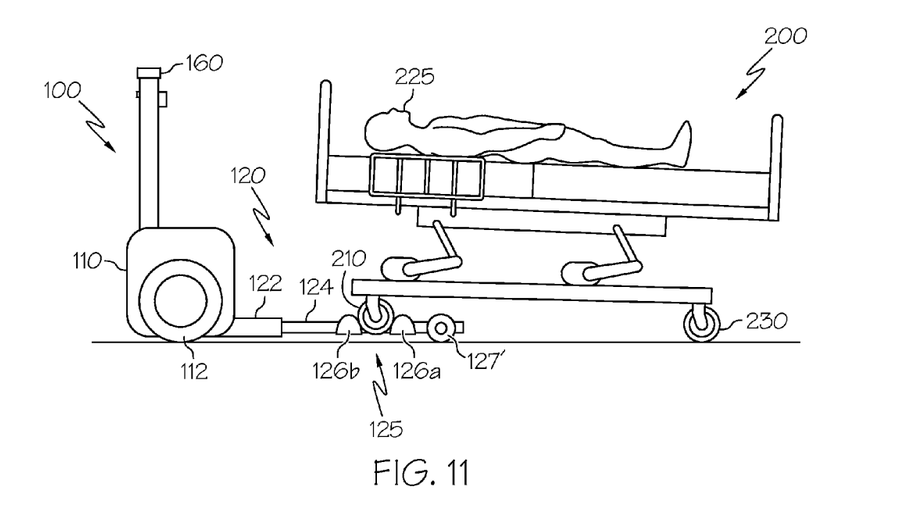
FIG. 11 depicts a robotic transportation device in an engaged position with a hospital bed according to one or more embodiments shown and described herein.

FIGS. 9-11 illustrate a target device of varying configurations wherein the target wheels are engaged with and locked by the adjustable wheel locking devices. FIG. 9 illustrates a wheel chair 300 having target wheels 310 that are held in place by the wheel stops 126a, 126b. The unlocked wheels 330 are free to rotate while the wheel chair 300 is being towed by the robotic transportation device 100. As illustrated in FIG. 9, a person 320 may be sitting in the wheel chair 300 as it is towed. FIG. 10 illustrates target wheels 410 of a lift device 400 in a locked position. The remaining wheels 430 are free to rotate. FIG. 11 depicts a person 225 lying on a hospital bed 200 that is coupled to a robotic transportation device 100. The target wheels 210 are maintained by the adjustable wheel locking devices 125 and the remaining wheels are free to rotate during transportation.

The robotic transportation device 100 may determine its location with proximity data as described above and calculate a navigation route to the desired destination corresponding to the second destination input signal. The navigation route may be based on the navigation data, the proximity data, the dimensions of the robotic transportation device 100 and the target device.

The robotic transportation device 100 then autonomously navigates throughout the facility to deliver the target device to the desired location. The robotic transportation device 100 tows the target device to the desired location. The target devices remaining unlocked wheels enable it to be towed by the robotic transportation device. For example, the unlocked wheels 330 of the wheels chair 300 (FIG. 9), the unlocked wheels 430 of the patient lift 400 (FIG. 10), and the unlocked wheels 220 of the hospital bed 220 (FIGS. 8 and 11) are free to rotate as the respective target device is towed.

When at the desired location (i.e., the destination), the robotic transportation device 100 may provide an audible or visual alert to nearby personnel that it has made the delivery. The device 100 may wait to have personnel uncouple the target device, or the instructions may be that the device 100 is to operate the docking arms 120 and the adjustable wheel locking devices 125 to autonomously decouple the target device. For example, the docking arms 120 may be lowered, the wheel stops 126a, 126b opened, and then the docking arms 120 slid from beneath the target wheels.

The robotic transportation device 100 may have additional destinations stored in a queue. The robotic transportation device 100 may then complete the pick ups and deliveries accordingly. If it has no further destinations in a queue, it may return to the base station for recharging. Additionally, the controller module 140 may detect when a charge of the batteries of the robotic transportation device 100 are below a threshold value. If the charge is below the threshold value, the robotic transportation device 100 may autonomously navigate to the base station for recharging after completing a pick up and delivery. Once the robotic transportation device 100 has completed a recharging session, it may continue to transport target devices.

Figure 12:
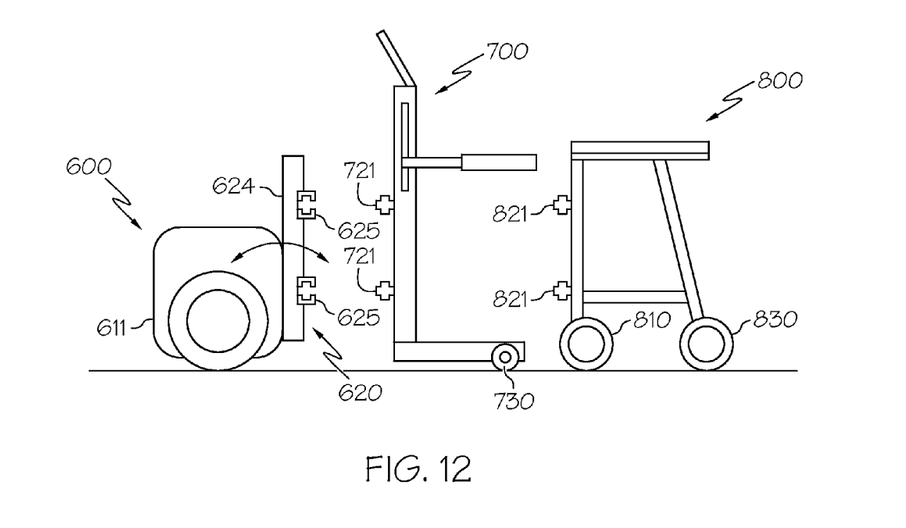
FIG. 12 depicts a side view of a robotic transportation device having a vertical docking member, and two target devices according to one or more embodiments shown and described herein.

Referring now to FIG. 12, a robotic transportation device having an alternative docking arrangement is illustrated. In the illustrated embodiment, a robotic transportation device 600 comprises a substantially vertical docking bracket 620 that is associated with a device body housing 611. The docking bracket 620 has a plurality of engagement connectors 625. The engagement connectors 625 are positioned and geometrically configured to mate with corresponding target device engagement connectors 721/821 positioned on a target device 700/800 during a docking operation. This docking arrangement may be useful to transport devices that do not have two sets of wheels. For example, the robotic transportation device 600 may approach the target device 700 to position the engagement connectors 625 onto the target device engagement connectors (e.g., target device engagement connectors 721 of cart 700). The engagement connectors 625 may be a clamp that may open and close (e.g., a solenoid operated clamp). When the engagement connectors 625 are positioned on the target device engagement connectors 721, the engagement connectors 625 may close around the target device engagement connectors 721. The robotic transportation device 600 may then transport the target (e.g., cart 700) to a desired location. To un-dock, the engagement connectors 625 may open and the robotic transportation device 600 may move away from the target device.

It should now be understood that the embodiments of the robotic transportation devices and systems described herein may be used to autonomously transport wheeled target devices within a facility such as a hospital, nursing home, rehabilitation center, etc. The robotic transportation devices may autonomously navigate to a target device, detect the configuration of the target device, and engage target wheels of the target device. Once the target wheels are engaged and locked, the robotic transportation device may tow the target device to a destination location. Hence, the robotic transportation device may autonomously pick up and deliver wheeled devices such as wheel chairs, hospital beds and the like without user intervention.

It is noted that the term "substantially" may be utilized herein to represent the inherent degree of uncertainty that may be attributed to any quantitative comparison, value, measurement, or other representation. This term may also be utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robotic transportation device comprising:
    a device body comprising at least one motorized wheel coupled to a drive motor;
    two docking arms, each docking arm comprising a support wheel and an adjustable wheel locking device, wherein:
        the two docking arms extend horizontally from the device body and are adjustable along at least two directions;
        the adjustable wheel locking devices comprise two wheel stops that extend laterally from the docking arm and are adjustable along a direction parallel with the two docking arms;
    a controller module comprising a processor and a computer readable memory having executable instructions, wherein the executable instructions, when read and executed by the processor, causes the controller module to:
        provide a drive signal to the at least one motorized wheel to cause the robotic transportation device to autonomously approach a target device;
        detect a device type of the target device;
        adjust a position of the two docking arms and the two wheel stops of each adjustable wheel locking device in accordance with the detected device type;
        move each adjustable wheel locking device under target wheels of the target device to lock and lift the target wheels; and
        provide a drive signal to the at least one motorized wheel to cause the robotic transportation device to autonomously transport the target device to a desired location.

2. The robotic transportation device as claimed in claim 1 further comprising a docking arm actuator mechanically coupled to the two docking arms and a wheel stop actuator mechanically coupled to each adjustable wheel locking device, wherein the executable instructions, when read and executed by the processor, causes the controller module to:
    determine a position of the target wheels in accordance with the detected device type and provide a drive signal to the docking arm actuator to adjust the position of the two docking arms such that the adjustable wheel locking devices are aligned with the target wheels;
    determine a size of the target wheels in accordance with the detected device type and provides a wheel stop control signal to the wheel stop actuator to adjust a distance between the two wheel stops of each adjustable wheel locking device such that the distance corresponds the size of the target wheels; and
    provide a drive signal to the docking arms to lift the target wheels.

3. The robotic transportation device as claimed in claim 1 further comprising a radio frequency receiver electrically coupled to the controller module for receiving an identification signal from a radio frequency identification tag associated with the target device, wherein the detected device type is based at least in part on a received identification signal.

4. The robotic transportation device as claimed in claim 1 further comprising a camera device electrically coupled to the controller module for generating a digital image of the target device, wherein the controller module compares the digital image of the target device generated by the camera device with registered device data associated with a plurality of registered device types to determine the detected device type from the plurality of registered device types.

5. The robotic transportation device as claimed in claim 1, wherein the executable instructions, when read and executed by the processor, causes the controller module to determine a dimension of the robotic transportation device coupled with the target device.

6. The robotic transportation device as claimed in claim 1, wherein the drive signal provided to the at least one motorized wheel to cause the robotic transportation device to autonomously transport the target device to the desired location is based at least in part on a position of the robotic transportation device and navigation data.

7. The robotic transportation device as claimed in claim 1 further comprising a substantially vertical docking bracket comprising an engagement connector, wherein the docking bracket is associated with the device body and the engagement connector is configured to mate with a target device engagement connector associated with the target device.

8. A robotic transportation device comprising:
a device body comprising at least one motorized wheel coupled to a drive motor;
two docking arms, each docking arm comprising a support wheel and an adjustable wheel locking device, wherein the two docking arms extend horizontally from the device body and are adjustable along at least two directions;
a wireless communications device that detects a location of the robotic transportation device, provides proximity data corresponding to the location of the robotic transportation device, and wirelessly receives navigational data, wherein the navigational data is based at least in part on facility floorplans;
a device detection module that obtains device data corresponding to a target device; and
a controller module comprising a processor and a computer readable memory having executable instructions, wherein the controller module is electrically coupled to the wireless communications device and the device detection module, and wherein the executable instructions, when read and executed by the processor, causes the controller module to:
receive the proximity data and the navigational data from the wireless communications device;
receive a first and second destination input signal;
provide a drive signal to the at least one motorized wheel to cause the robotic transportation device to autonomously travel to a first destination associated with the first destination input signal such that the target device autonomously approaches the target device, the drive signal based at least in part on a navigation route calculated from the proximity data and the navigational data;
receive the device data from the device detection module and determines a device type of the target device;
control the docking arms to engage the adjustable wheel locking devices with target wheels of the target device; and
provide a drive signal to the at least one motorized wheel to cause the robotic transportation device to autonomously travel to a second destination associated with the second destination input signal, the drive signal based at least in part on the navigation route calculated from the proximity data and the navigational data.

9. The robotic transportation device as claimed in claim 8, wherein:
the device detection module comprises a radio frequency receiver that receives an identification signal from a radio frequency identification tag associated with the target device; and
the device data is based at least in part on the received identification signal.

10. The robotic transportation device as claimed in claim 8 wherein:
the device detection module comprises a camera device that generates a digital image of the target device;
the device data is based at least in part on the digital image; and
the executable instructions, when read and executed by the processor, causes the controller module to compare the digital image of the target device generated by the camera device with registered device data associated a plurality of registered device types to determine the detected device type from the plurality of registered device types.

11. The robotic transportation device as claimed in claim 8, wherein the executable instructions, when read and executed by the processor, causes the controller module to determine a dimension of the robotic transportation device coupled with the target device, and the navigation route is further based at least in part on the dimension.

12. The robotic transportation device as claimed in claim 8, wherein:
the adjustable wheel locking devices comprise two wheel stops that extend laterally from the docking arm and are adjustable along a direction parallel with the two docking arms;
the robotic transportation device further comprises a docking arm actuator mechanically coupled to the two docking arms and a wheel stop actuator mechanically coupled to each adjustable wheel locking device, and
the executable instructions, when read and executed by the processor, causes the controller module to:
determine a position of target wheels of the target device in accordance with the detected device type and provides a drive signal to the docking arm actuator to adjust the position of the two docking arms such that the adjustable wheel locking devices are aligned with the target wheels;
determine a size of the target wheels in accordance with the detected device type and provides a wheel stop control signal to the wheel stop actuator to adjust a distance between the two wheel stops of each adjustable wheel locking device such that the distance corresponds the size of the target wheels; and
provide a drive signal to the docking arms to lift the target wheels.

13. The robotic transportation device as claimed in claim 8 further comprising an infrared detector for receiving an infrared light guide signal associated with the target device, wherein the infrared light guide signal is indicative of a position of the target device and the controller module provides a drive signal to the at least one motorized wheel based at least in part on the received infrared light guide signal to autonomously approach the target device.

14. The robotic transportation device as claimed in claim 8 further comprising a substantially vertical docking bracket comprising an engagement connector, wherein the docking bracket is associated with the device body and the engagement connector is configured to mate with a target device engagement connector associated with the target device.

15. A robotic transportation system comprising:
a wireless communications network;
a central server communicatively coupled to the wireless communications network, wherein the central server provides navigation data over the wireless communications network;
a radio frequency identification tag configured to emit an identification signal, wherein the radio frequency identification tag is coupled to a target device; and
a robotic transportation device comprising:
a device body comprising at least one motorized wheel coupled to a drive motor;
two docking arms, each docking arm comprising a support wheel and an adjustable wheel locking device, wherein the two docking arms extend horizontally from the device body and are adjustable along at least two directions;

a wireless communications device communicatively coupled to the wireless communications network, wherein the wireless communications device provides proximity data corresponding to a location of the robotic transportation device, and wirelessly receives navigational data over the wireless communications network emitted by the central server;

a controller module electrically coupled to the wireless communications device, wherein the controller module:

receives the proximity data and the navigational data from the wireless communications device;

determines the location of the robotic transportation device from the proximity data;

detects a device type of the target device;

provides a drive signal to the at least one motorized wheel to cause the robotic transportation device to autonomously approach the target device, the drive signal based at least in part on the proximity data and the navigational data;

controls the docking arms in accordance with the device type to engage the adjustable wheel locking devices with the target wheels of the target device; and     provides a drive signal to the at least one motorized wheel to cause the robotic transportation device to autonomously tow the target device to a desired location, the drive signal based at least in part on the proximity data and the navigational data.

16. The robotic transportation system as claimed in claim 15, wherein the robotic transportation device further comprises a radio frequency receiver electrically coupled to the controller module for receiving the identification signal from the radio frequency identification tag associated with the target device, and the detected device type is based at least in part on a received identification signal.

17. The robotic transportation system as claimed in claim 15, wherein the robotic transportation device further comprises a camera device electrically coupled to the controller module for generating a digital image of the target device, and the controller module compares the digital image of the target device generated by the camera device with registered device data associated with a plurality of registered device types to determine the detected device type from the plurality of registered device types.

18. The robotic transportation system as claimed in claim 15 further comprising a plurality of local position tags configured to be positioned throughout a facility, wherein:

each local position tag emits a location signal detected by the wireless communications device; and     the drive signal is further based on the received location signals such that the robotic transportation device navigates through the facility.

19. The robotic transportation system as claimed in claim 15, wherein the robotic transportation device further comprises an infrared detector for receiving an infrared light guide signal associated with the target device, the infrared light guide signal is indicative of a position of the target device, and the controller module provides a drive signal to the at least one motorized wheel based at least in part on the received infrared light guide signal such that the robotic transportation device autonomously approaches the target device.

20. The robotic transportation system as claimed in claim 15, wherein the controller module determines a dimension of the robotic transportation device coupled with the target device.

\* \* \* \* \*

UNITED STATES PATENT AND TRADEMARK OFFICE
CERTIFICATE OF CORRECTION

PATENT NO. : 8,165,718 B2
APPLICATION NO. : 12/847572
DATED : April 24, 2012
INVENTOR(S) : Yasuhiro Ota et al.

It is certified that error appears in the above-identified patent and that said Letters Patent is hereby corrected as shown below:

On the title page item (73) add the following Assignee:

Illinois Institute of Technology, Chicago, IL (US)

Signed and Sealed this
Tenth Day of May, 2016

Michelle K. Lee
*Director of the United States Patent and Trademark Office*